US012762816B2

(12) United States Patent
Goodsitt et al.

(10) Patent No.: US 12,762,816 B2
(45) Date of Patent: Oct. 13, 2026

(54) VIRTUAL RENDERING OF MACHINE LEARNING MODELS

(71) Applicant: Capital One Services, LLC, McLean, VA (US)

(72) Inventors: Jeremy Goodsitt, Champaign, IL (US); Brian Barr, Schenectady, NY (US); Michael Davis, Arlington, VA (US); Taylor Turner, Richmond, VA (US); Owen Reinert, Queens, NY (US)

(73) Assignee: Capital One Services, LLC, McLean, VA (US)

( * ) Notice: Subject to any disclaimer, the term of this patent is extended or adjusted under 35 U.S.C. 154(b) by 254 days.

(21) Appl. No.: 18/773,573

(22) Filed: Jul. 15, 2024

(65) Prior Publication Data

US 2026/0017904 A1 Jan. 15, 2026

(51) Int. Cl.

| | |
|---|---|
| ***G06T 19/20*** | (2011.01) |
| ***G06F 3/01*** | (2006.01) |
| ***G06T 11/26*** | (2026.01) |

(52) U.S. Cl.

CPC .............. *G06T 19/20* (2013.01); *G06F 3/017* (2013.01); *G06T 11/26* (2026.01); *G06T 2219/2012* (2013.01); *G06T 2219/2016* (2013.01)

(58) Field of Classification Search

CPC ............. G06T 19/20; G06T 2219/2012; G06T 2219/2016; G06F 3/017

See application file for complete search history.

(56) References Cited

U.S. PATENT DOCUMENTS

| | | | | |
|---|---|---|---|---|
| 11,557,085 | B2 * | 1/2023 | Boyce | G06T 17/00 |
| 2021/0073429 | A1 * | 3/2021 | Blechschmidt | G06F 30/10 |
| 2021/0233300 | A1 * | 7/2021 | Borer | G06N 3/09 |

* cited by examiner

*Primary Examiner* — Michelle L Sams

(74) *Attorney, Agent, or Firm* — Foley & Lardner LLP

(57) ABSTRACT

Systems and methods for visual manipulation and execution of machine learning models rendered in a three-dimensional space. In some aspects, the system receives configuration data representing a machine learning model and generates a three-dimensional representation of the machine learning model by (1) generating virtual objects corresponding to nodes and edges of the model and (2) configuring values of virtual object parameters for virtual objects based on associated weight matrices from the configuration data. The system detects a user gesture that indicates a command to perform a modification of the machine learning model and, responsive to detecting the user gesture, causes execution of a modified machine learning model. The system generates a new three-dimensional representation of the modified machine learning model.

20 Claims, 7 Drawing Sheets

VIRTUAL RENDERING OF MACHINE LEARNING MODELS

SUMMARY

Machine learning models have become a critical aspect of everyday life in numerous applications. For example, machine learning models are often used in healthcare to diagnose diseases or predict patient outcomes. Machine learning models are also used in critical tasks such as object detection in self-driving vehicles and even in fraud detection to prevent fraudulent transactions from taking place. In such cases, the accuracy of such models is important for making decisions for inputs that may be harder to classify. Accuracy in some tasks may ensure safety or health, or it may prevent fraud.

Understanding a model is crucial for improving its accuracy. For example, the weights of specific models may be used to determine which features are important, identify biases, or optimize the model, or simply for better interpretability of the model. However, while understanding a machine learning model is important in improving accuracy of the model, models are often difficult to understand. For example, machine learning models may be especially difficult to understand where the model is complex, includes many layers, and is high-dimensional. Similarly, for those who lack experience, values of weights that are edges of the models may be too far removed and abstract to be useful.

The complexity is compounded where machine learning engineers desire to understand changes in a model after execution of different inputs and after modifications are made to the model. For example, after modifications such as dropping nodes, tuning parameters, and/or the like, in order to understand how the model has changed, or how the classifications of inputs have changed, engineers are typically required to review files that list weights, edges, and nodes without further elaboration. Understanding such machine learning models is conventionally an intensive process.

Accordingly, a mechanism is desired that would enable users, such as machine learning engineers, to easily manipulate models and subsequently view and understand changes to the models. One mechanism for doing so enables a user to view a virtual representation of a machine learning model such as through a display of a virtual reality (VR) headset. For example, a device, such as a VR headset, may receive data about a machine learning model, such as nodes, edges, and weights of a model, and subsequently generate a three-dimensional (3D) representation of the machine learning model. A user may manipulate the model via gestures, and the system may cause execution of the modified model on input data. The modification of the model can be visualized to the user via differences in parameters such as opacity, color, border size, and/or the like. Therefore, methods and systems are described herein for visual manipulation and execution of machine learning models rendered in a three-dimensional space. A visual rendering system may be used to perform operations described herein.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
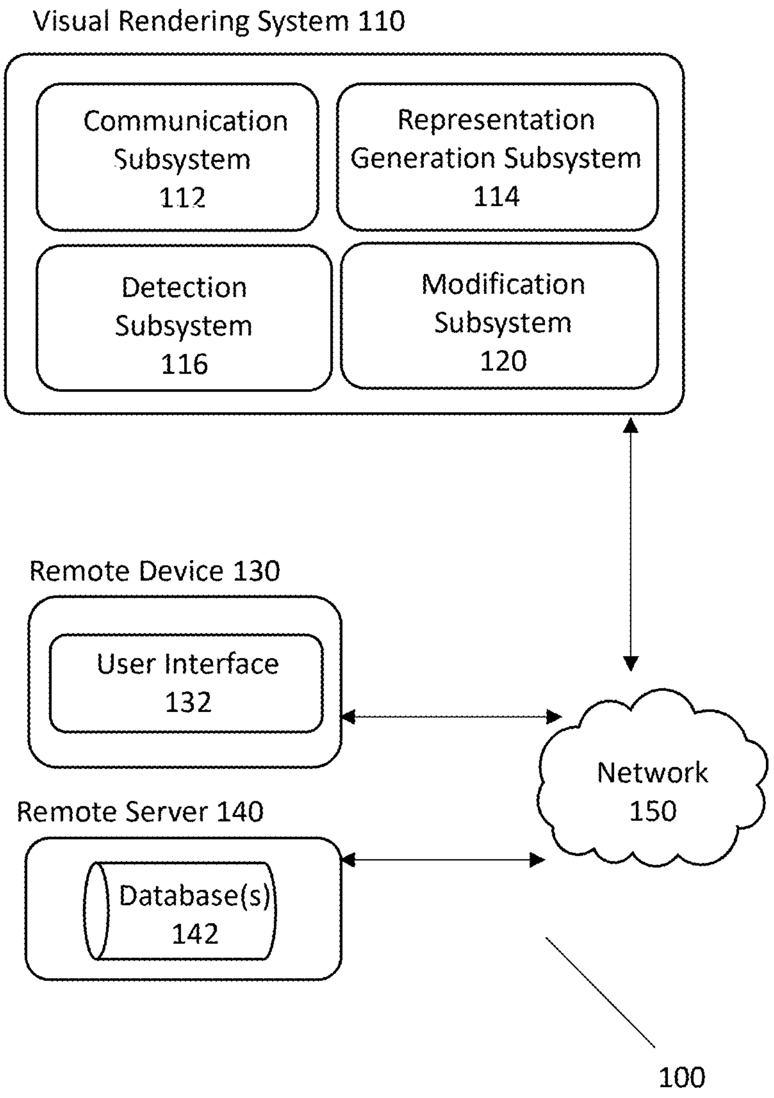
FIG. 1 shows an illustrative system for visual manipulation and execution of machine learning models rendered in a three-dimensional space, in accordance with one or more embodiments of this disclosure.

Environment 100 of FIG. 1 is an example system for visual manipulation and execution of machine learning models rendered in a three-dimensional space, in accordance with one or more embodiments of this disclosure. Environment 100 includes visual rendering system 110, remote device 130, and remote server 140. Visual rendering system 110 may execute instructions for manipulation and execution of machine learning models rendered in a three-dimensional space. Visual rendering system 110 may include software, hardware, or a combination of the two. For example, visual rendering system 110 may be a physical server or a virtual server that is running on a physical computer system. In some embodiments, visual rendering system 110 may be configured on a user device (e.g., a laptop computer, a smartphone, a desktop computer, an electronic tablet, or another suitable user device). In particular, the visual rendering system 110 may be configured on a virtual reality (VR), augmented reality (AR), and/or mixed reality (MR) headset or glasses.

Visual rendering system 110 may receive configuration data, such as data structures including one or more components representing a machine learning model. For example, where visual rendering system 110 is a headset (e.g., VR, extended reality (XR), AR), the visual rendering system may obtain or access from local storage, or from a remote database, information regarding a machine learning model, such as parameters that define the model. In some examples, the components may represent a machine learning model and each component may include nodes, one or more edges, and associated weight matrices of the machine learning model. The visual rendering system 110 may then generate three-dimensional representations of the machine learning model and render it for a user's viewing. The visual rendering system 110 may also be configured to detect user gestures or other input for interacting with the machine learning model, such as to modify the machine learning model. Responsive to detecting the user gesture, the visual rendering system 110 may cause execution of a modified machine learning model and can generate a new three-dimensional rendering of the model for viewing.

In some embodiments, visual rendering system 110 may receive the configuration data using communication subsystem 112. For example, visual rendering system 110 may receive the data from a user at a remote device 130 via user interface 132 or from database(s) 142 of remote server 140 via network 150. Network 150 may be a local area network (LAN), a wide area network (WAN; e.g., the internet), or a combination of the two. Communication subsystem 112 may include software components, hardware components, or a combination of both. For example, communication subsystem 112 may include a network card (e.g., a wireless network card and/or a wired network card) that is associated with software to drive the card. Communication subsystem 112 may pass at least a portion of the data, or a pointer to the data in memory, to other subsystems such as representation generation subsystem 114, detection subsystem 116, or modification subsystem 120.

Figure 2:
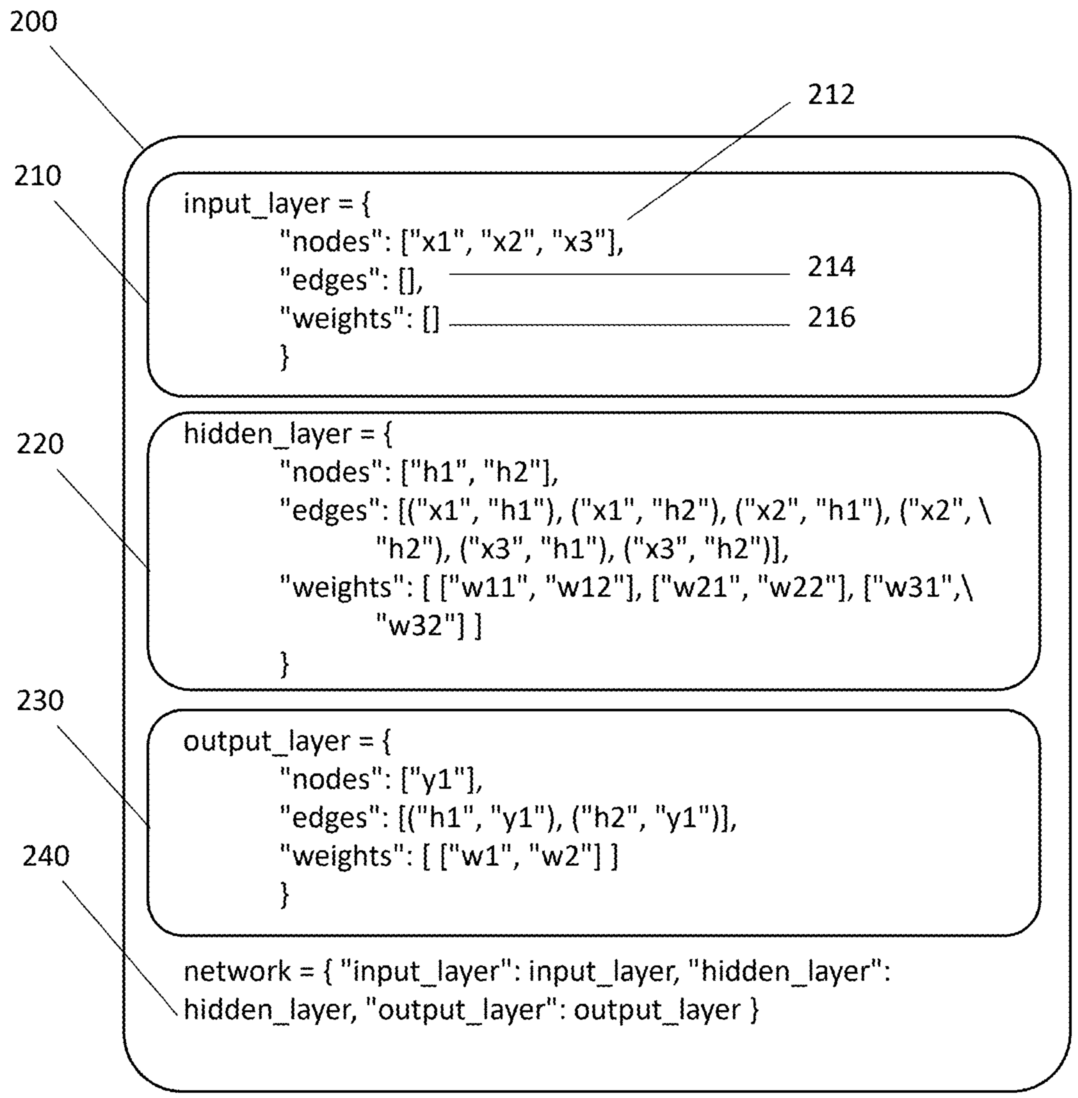
FIG. 2 illustrates exemplary configuration data for visual manipulation and execution of machine learning models rendered in a three-dimensional space, in accordance with one or more embodiments of this disclosure.

For example, FIG. 2 illustrates exemplary configuration data for visual manipulation and execution of machine learning models rendered in a three-dimensional space, in accordance with one or more embodiments of this disclosure. FIG. 2 illustrates a file 200 representing a machine learning model. The file 200 may include one or more components such as component 210, component 220, component 230, and component 240. As described herein, each of the components may include nodes, one or more edges, and associated weight matrices of the machine learning model. In some examples, each of the components may be representative of a layer of a machine learning model. In some examples, the configuration data may further include a decision boundary representative of a hypersurface that separates data points in one class from the data points in another class.

In the example of FIG. 2, component 210 represents an input layer to a machine learning model and includes a data structure that defines nodes 212, edges 214, and weights 216. Similarly, component 220 of FIG. 2 represents a hidden layer to the machine learning model and may also be defined by nodes, edges, and weights. Component 230 includes an output layer to the machine learning model and may also be defined by nodes, edges, and weights. Component 240 of FIG. 2 defines a network of the machine learning model using the components representative of the layers of the network.

Communication subsystem 112 may pass at least a portion of the configuration data, or a pointer to the data in memory, to representation generation subsystem 114. Representation generation subsystem may be configured to render a visual representation of the machine learning model. In some examples, the representation generation subsystem 114 may generate a three-dimensional representation of the machine learning model by generating virtual objects corresponding to the plurality of nodes and the one or more edges and configuring values of virtual object parameters for the virtual objects based on the associated weight matrices. For example, the representation generation subsystem 114 may generate corresponding data structures for virtual objects that define the nodes, edges, and weights in a three-dimensional space, and may further map the virtual objects onto a spatial domain for display to a user.

Figure 3:
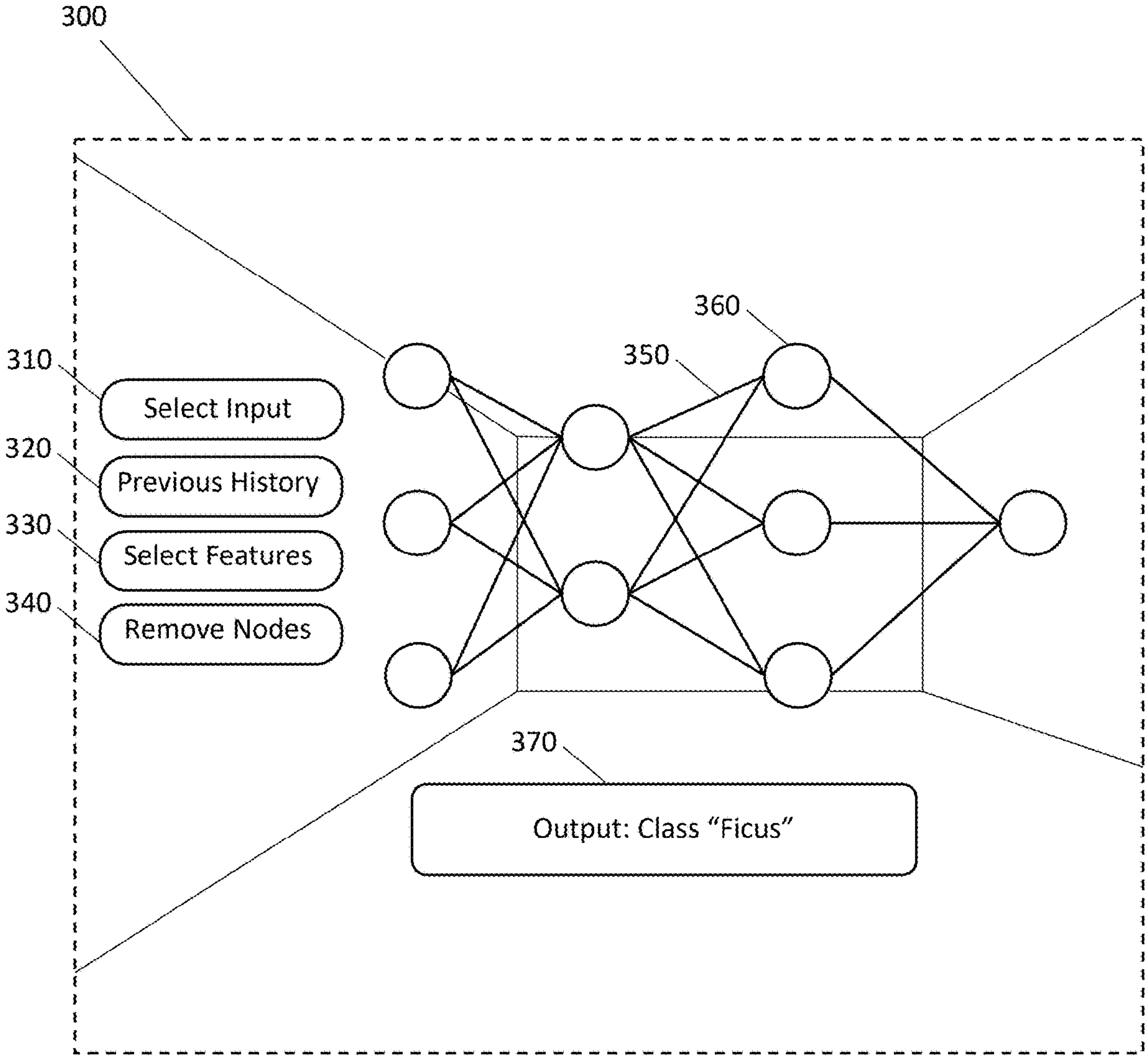
FIG. 3 illustrates an exemplary representation in a three-dimensional spatial space of a machine learning model, in accordance with one or more embodiments of this disclosure.

For example, FIG. 3 illustrates an exemplary representation in a three-dimensional spatial space of a machine learning model, in accordance with one or more embodiments of this disclosure. For example, FIG. 3 includes a display 300 of a user, and a machine learning model network in the view of the user within a physical space, such as a room. The machine learning model may include nodes such as virtual object 360 representing a node and edges such as virtual object 350 between the nodes. According to some examples, each column of virtual objects representing nodes in three-dimensional space may represent a layer to the machine learning model network. The virtual objects may include virtual object parameters such as opacity of a virtual object, size of the virtual object, border size of the virtual object, color of the virtual object, and/or border color of the virtual object.

As described herein, the representation generation subsystem 114 may generate corresponding data structures for virtual objects that define the nodes, edges, and weights in a three-dimensional space. The data structures may include virtual object parameters and values for each virtual object parameter, which can be used to render the virtual objects in different ways to visually emphasize different effects of the network. For example, nodes that are activated during execution of an input value can be visually emphasized by color (e.g., bolder or higher intensity colors), by opacity (e.g., opaquer than those not activated), by border size (e.g., higher border size based on activation) and/or the like. For example, configuring the values of the virtual object parameters comprises increasing or decreasing the values of the virtual object parameters.

As described herein, the configuration data may further comprise a decision boundary representative of a hypersurface that separates data points in one class from the data points in another class. Generating the new three-dimensional representation of the modified machine learning model further may include generating a visual representation of data points of the input data and a surface representing the decision boundary dividing the data points into different classes. According to some examples, in order to display a hypersurface indicative of one or more decision boundaries or loss surface, the system may first perform one or more dimensionality reduction techniques based on the model. Such techniques may include principal component analysis (PCA), uniform manifold approximation and projection (UMAP) or t-distributed stochastic neighbor embedding (T-SNE).

Once generated, the representation may be displayed. For example, in the case that the visual rendering system 110 is part of or included in a VR, AR, or XR device (e.g., headset), the system may render the representation on the display for viewing by a user using the headset. In some cases where the display is mirrored on a computer or like device, the system may also transmit the representation or the display comprising the representation to the user for viewing on a display of a remote device.

FIG. 3 also shows a series of options for selection, e.g., by a user. For example, the display 300 may include options such as option 310 to select an input, option 320 to view previous history, option 330 to select features, and option 340 to remove nodes from the network (e.g., of the machine learning model). The system may detect a user gesture that indicates a command to perform a modification of the machine learning model. For example, the system may include one or more sensors (e.g., lidar, cameras, etc.) that are able to detect a user's hands, eyes, or other input. In some examples, the user may view and gesture to select one or more options. Alternatively, a user may select specific nodes or edges to change values specific to the nodes or edges (e.g., weights, removal of nodes). Responsive to detecting the user gesture, the system may cause execution of a modified machine learning model using input data and obtain output data for one or more modified components associated with the modified machine learning model.

As described herein, the display 300 includes option 320 to view previous history, which a user may select, such as through user gestures or other input, to view previous model versions, inputs, and corresponding outputs, as well as specific configuration data of the previous model versions. For example, the system may store, either locally or on a remote database, one or more data structures corresponding to the one or more components representing the machine learning model and the three-dimensional representation of the machine learning model as a first version of the machine learning model. In particular, the system or remote database may store the one or more modified components associated with the modified machine learning model, the new three-dimensional representation of the modified machine learning model, and the input data as a second version of the machine learning model. The system may generate, for display, interactive elements for selection of the first version and the second version of the machine learning model.

In some examples, modification of the model may include training of the machine learning model, and causing execution of the modified machine learning model may include passing input data (e.g., training data) into a machine learning model. The execution may cause weights of associated weight matrices to be updated. In some examples, the modification may include a change to a weight, removal of an edge and/or the like. Execution of the modified machine learning model may include automatic modification of at least one value of the one or more nodes, one or more edges, or associated weight matrices to reflect a new configuration for the machine learning model. In some examples, the user may modify values for the decision boundary, or may move the virtual surface representing a hyperplane.

As described herein, responsive to detecting the user gesture, the modification subsystem 120 may cause execution of the modified machine learning model using input data and obtain output data for one or more modified components associated with the modified machine learning model. In some examples, the system may perform the execution of the model locally (e.g., on the same device that hosts the visual rendering system 110). In other examples, the system may transmit the indication of the modification to be made, e.g., via communication subsystem 112, to a remote server, which may be configured to execute the modified machine learning model on a selected input. The remote server may then transmit the results of the executed machine learning model (e.g., the outputs) as well as the adjusted parameters of the model network (e.g., node values, edge values, weight matrices) to the visual rendering system 110 via the network 150.

In some examples, the remote server 140 may store past histories of the machine learning model, including configuration files, inputs, and outputs from prior execution. The remote server 140 may compare the changes in the configuration file between the previous version of the model and the new modified model and may only transmit the changes to the visual rendering system 110 via the network 150 according to some examples.

According to some examples, the modification subsystem 120 may modify the network and corresponding configuration file or may transmit a command to cause modification and execution of the modified model as described herein. The modification subsystem 120 may pass a portion or the whole modified model or the configuration file representing the modified model to the representation generation subsystem 114 to generate, e.g., for display, a new three-dimensional representation of the modified machine learning model by modifying the values of the virtual object parameters based on the one or more modified components and configuring the values of the virtual object parameters based on the associated weight matrices of the one or more modified components.

According to some embodiments, a user may indicate, e.g., via a user gesture to execute the machine learning model using one or more selected inputs. The system may transmit, e.g., to a remote server 140, a command to execute the machine learning model on the selected input(s), e.g., by transmitting an identifier identifying the machine learning model and input or by transmitting configuration data and inputs. The remote server 140 may then execute the machine learning model on the inputs and transmit the output to the visual rendering system 110. The output may be identified to the user, e.g., by displaying the output. For example, FIG. 3 shows output 370 that classifies the input as a "Ficus."

In some examples, the system may also identify the traversal of the input through the network, e.g., by identifying nodes that are activated when the model is executed on an input. For example, the visual rendering system 110 may receive a traversal data structure comprising node identifiers for identifying specific nodes of the modified machine learning model and corresponding output values for each node computed as a result of executing the modified machine learning model on the input data. The system may then identify one or more virtual objects corresponding to each node of the modified machine learning model based on the node identifiers and configuring, for each node, the values of the virtual object parameters for a virtual object associated with a node identifier based on a corresponding output value of a node when the machine learning model is executed on the input data to visually emphasize nodes of the modified machine learning model that are activated and/or visually deemphasize the nodes of the machine learning model that are not activated.

In some examples, the system may show, for one or more different data inputs, how the data computationally progresses over time. In some examples, the system may also indicate weighting changes through the model as the data progresses as well. For example, the system may visually emphasize, or otherwise indicate, the flow of an input from the beginning of the network to the end over time. The system may, for example, modify values for one or more virtual objects corresponding to the nodes, layers, and connections in real-time to show the passage of the data through the network. For example, in some cases, the system may highlight at least a portion of a node, layer, or connection the data is traversing in order to indicate traversal. In some examples, the traversal of the data may be shown in real time or near real time, e.g., upon computation. Alternatively or additionally, the system may store values relating to the traversal of the data over time and display it to the user in an asynchronous manner, e.g., not real-time.

In some examples, the system may display layers or connections between nodes as lines, pipes, or routes between the nodes, and may show the data as another virtual object traversing through the virtual representation of the nodes, connections, and layers. The virtual object may include a shape such as a dot or line that traverses through the network. Alternatively or additionally, the virtual object representing the data may be a graphic of water passing through, particles, etc. Depending on the importance of the node or path, the virtual object representing the data may pass more quickly or slowly on different paths or close to different nodes. In some examples, the virtual object representing the data may also grow or decrease in size to emphasize the importance of certain paths or nodes as well. In this way, a user may be enabled to see how data computationally progresses over time and the weighting changes through the model.

In some examples, a user can identify nodes that are important or not important based on how the nodes of the machine learning model are emphasized. For example, nodes that are not activated may be more transparent or less colorful, and a user may derive that these nodes are less important in the model in classifying the input. Alternatively or additionally, the system may identify candidate nodes from the nodes for removal from the modified machine learning model based on a number of edges associated with the node, a magnitude of the values of an associated weight matrix of the node, or the corresponding output value of the node when the modified machine learning model is executed on the input data. The system may further generate a three-dimensional visual representation of an interactive element for selection of one or more candidate nodes for removing from the modified machine learning model using representation generation subsystem 114.

Figure 5:
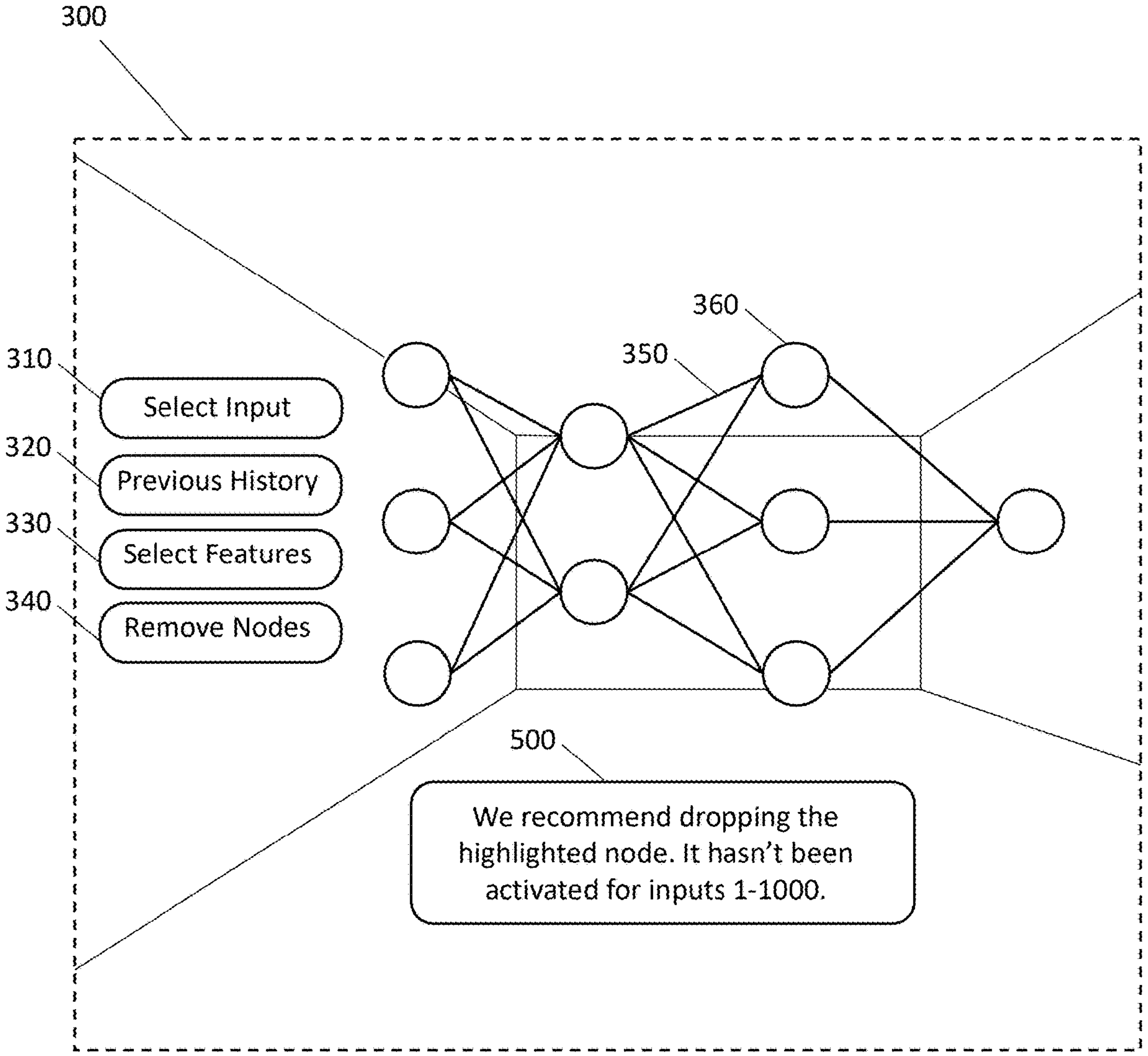
FIG. 5 illustrates an exemplary recommendation, in accordance with one or more embodiments of this disclosure.

According to some examples, the system may also provide recommendations, such as recommendations for nodes to be dropped. For example, FIG. 5 illustrates an exemplary recommendation, in accordance with one or more embodiments of this disclosure. Recommendation 500 is displayed to the user to identify specific nodes recommended to the user to drop: "We recommend dropping the highlighted node. It hasn't been activated for inputs 1-1000." In combination with the recommendation, the representation generation subsystem 114 may highlight the node identified in the recommendation.

In some embodiments, the system may detect a second user gesture indicative of a user interaction with the interactive element for the selection of the one or more candidate nodes for removal from the modified machine learning model. For example, the user may select the highlighted node, or a different node, or select the recommendation. Responsive to detecting the second user gesture, the system may transmit a command for the execution of the modified machine learning model with the one or more candidate nodes removed, e.g., via the communication subsystem 112.

In some examples, the representation generation subsystem 114 may also generate representations for interactive elements for tuning parameters of the model. For example, the system may generate, for display, one or more three-dimensional interactive elements for tuning one or more parameters or selecting or deselecting one or more features in a spatial domain. In one example, the interactive element may be a dial, buttons, a slider (e.g., sliding bar, or scroll bar), or a text box to input numbers. The system may detect a second user gesture, e.g., using sensors, indicative of a user interaction with the one or more three-dimensional interactive elements. For example, the user may turn the dial or input a number to modify the values of nodes, edges, or weights. Responsive to detecting the second user gesture, the system may transmit data indicative of tuned parameters or selected or deselected one or more features, e.g., through the communication subsystem 112. The system may then update the one or more three-dimensional interactive elements based on the second user gesture. For example, if the user makes a gesture to scroll the scroll bar, the visual display may reflect the modification.

Figure 4:
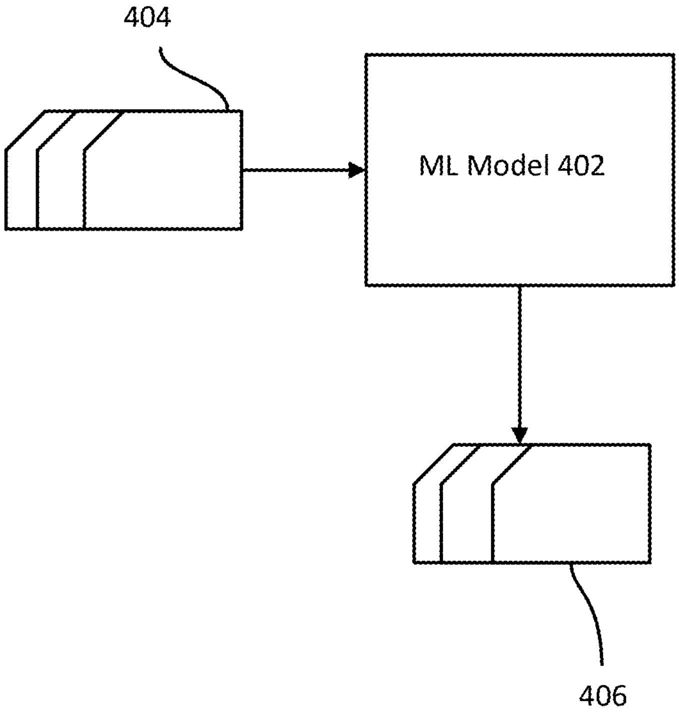
FIG. 4 illustrates an exemplary machine learning model, in accordance with one or more embodiments of this disclosure.

FIG. 4 illustrates an exemplary machine learning model 402 (e.g., the first and/or second machine learning model). According to some examples, the machine learning model may be any model, such as a model for classification. For example, the machine learning model may be trained to intake input 404 including input data and receive, as a result of inputting the input 404 into the machine learning model an output 406. The machine learning model may have been trained on a training dataset containing a plurality of user parameters and corresponding dynamic and stable features. An exemplary machine learning model is described in relation to FIG. 4 herein.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification of the machine learning model, and an input known to correspond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Figure 6:
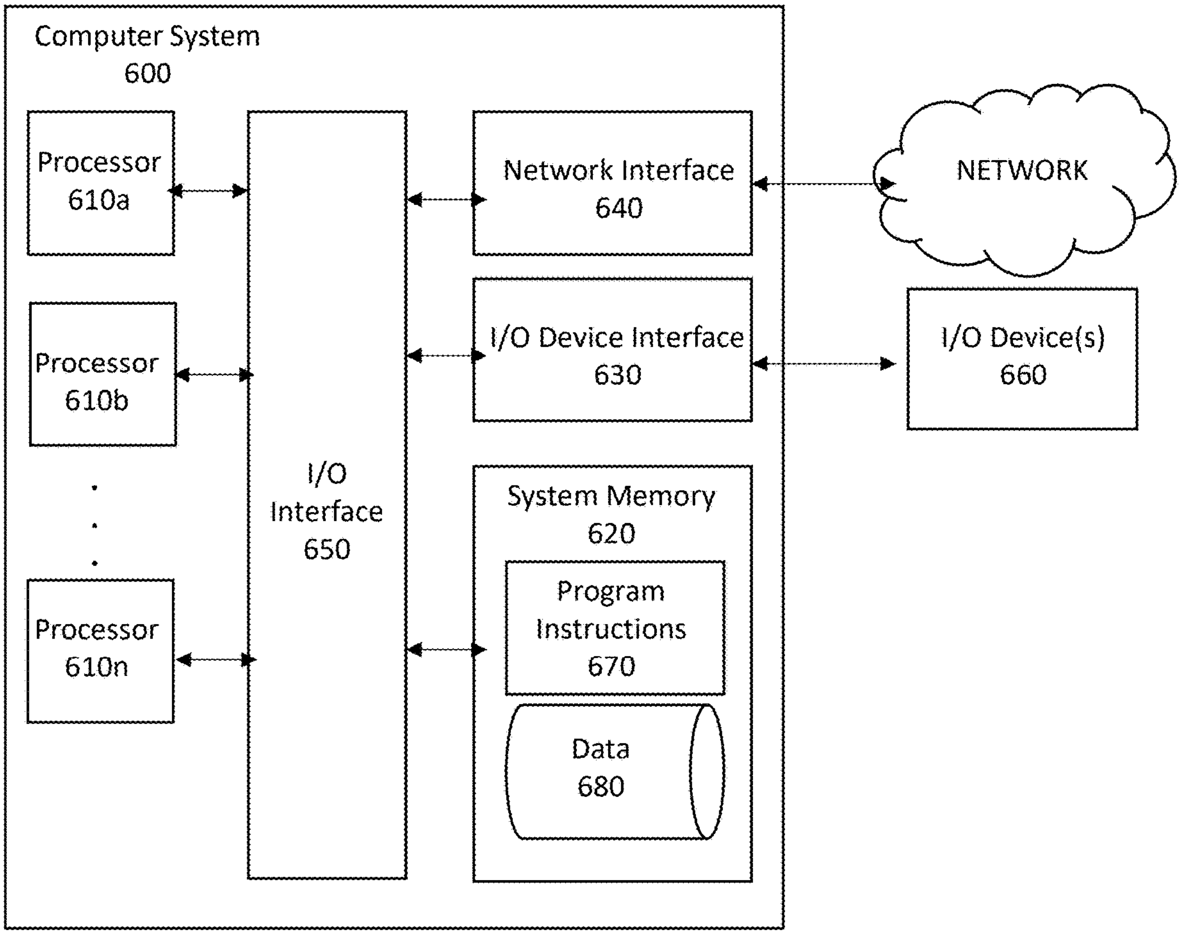
FIG. 6 illustrates a computing device that can be used for identifying objects based on previous user-object interactions, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions.

A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multiprocessor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

The I/O device interface 630 and I/O devices 660 may be used to enable manipulation of the three-dimensional model as well. For example, the user may be able to user I/O devices such as a keyboard and touchpad to indicate specific selections for nodes, adjust values for nodes, select from the history of machine learning models, select specific inputs or outputs and/or the like. Alternatively or additionally, the user may use their voice to indicate specific nodes, specific models, and/or the like via the voice recognition device and/or microphones.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a LAN, a WAN, a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600 or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
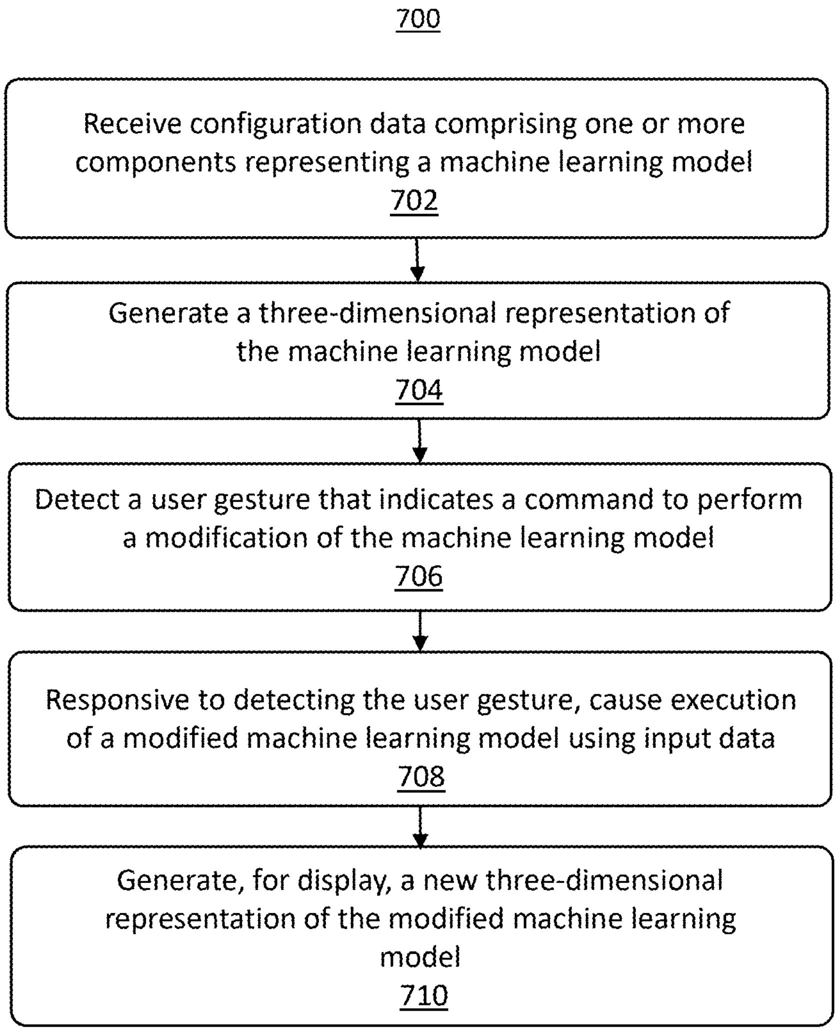
FIG. 7 is a flowchart of operations for identifying objects based on previous user-object interactions, in accordance with one or more embodiments of this disclosure.

FIG. 7 is a flowchart 700 of operations for visual manipulation and execution of machine learning models rendered in a three-dimensional space, in accordance with one or more embodiments of this disclosure. The operations of FIG. 7 may use components described in relation to FIG. 6. In some embodiments, visual rendering system 110 may include one or more components of computer system 600.

At 702, one or more of processors 610*a*-610*n* receive configuration data comprising one or more components representing a machine learning model. For example, one or more of processors 610*a*-610*n* may receive configuration data comprising one or more components representing a machine learning model, wherein each component of the one or more components comprises a plurality of nodes, one or more edges, and associated weight matrices of the machine learning model. One or more of processors 610*a*-610*n* may receive the data over network 150 using network interface 640. Visual rendering system 110 may use one or more processors 610*a*, 610*b*, and/or 610*n* to perform the receiving.

As disclosed herein, FIG. 2 illustrates a file 200 representing a machine learning model. In some examples, each of the components (e.g., nodes, edges, and/or associated weight matrices) may be representative of a layer of a machine learning model. In some examples, the configuration data may further include a decision boundary representative of a hypersurface that separates data points in one class from the data points in another class.

At 704, one or more of processors 610*a*-610*n* generates a three-dimensional representation of the machine learning model. For example, the one or more of processors 610*a*-610*n* may generate a three-dimensional representation of the machine learning model by (1) generating virtual objects corresponding to the plurality of nodes and the one or more edges and (2) configuring values of virtual object parameters for the virtual objects based on the associated weight matrices. Visual rendering system 110 may use one or more processors 610*a*, 610*b*, and/or 610*n* to perform the generating.

For example, the machine learning model may include nodes such as virtual objects representing nodes or edges. According to some examples, each column of virtual objects representing nodes in three-dimensional space may represent a layer to the machine learning model network. The virtual objects may include virtual object parameters such as opacity of a virtual object, size of the virtual object, border size of the virtual object, color of the virtual object, and/or border color of the virtual object. The virtual object parameters may further include distance, such as perceived distance from the user and/or distance in a spatial mapping. For example, virtual objects may have a distance that is larger or smaller indicative of whether the object is further or closer. A virtual object may be displayed to be closer, for example, if it is of higher importance such as if values of the object are larger. In some examples, corresponding data structures for virtual objects that define the nodes, edges, and weights in a three-dimensional space may also be generated.

The data structures may include virtual object parameters and values for each virtual object parameter, which can be used to render the virtual objects in different ways to visually emphasize different effects of the network. For example, nodes that are activated during execution of an input value can be visually emphasized by color such as through bolder or higher intensity colors, by opacity (e.g., opaquer than those not activated), by border size (e.g., higher border size based on activation) and/or similar visual emphasis. For example, configuring the values of the virtual object parameters comprises increasing or decreasing the values of the virtual object parameters.

At 706, one or more of processors 610*a*-610*n* detects a user gesture that indicates a command to perform a modification of the machine learning model. For example, the one or more of processors 610*a*-610*n* may detect a user gesture that indicates a command to perform a modification of the machine learning model. For example, visual rendering system 110 may use one or more processors 610*a*-610*n* to perform the operations. The system may include one or more sensors (e.g., lidar, cameras, etc.) that are able to detect a user's hands, eyes, or other input. In particular, the user may view and gesture to select one or more options. Alternatively, a user may select specific nodes or edges to change values specific to the nodes or edges (e.g., weights, removal of nodes).

At 708, one or more of processors 610*a*-610*n*, responsive to detecting the user gesture, causes execution of a modified machine learning model using input data. For example, the one or more of processors 610*a*-610*n* may, responsive to detecting the user gesture, cause execution of a modified machine learning model using input data and obtaining output data for one or more modified components associated with the modified machine learning model. For example, visual rendering system 110 may use one or more processors 610*a*-610*n* to perform the operations and may store the results in system memory 620.

At 710, one or more of processors 610*a*-610*n* generates, for display, a new three-dimensional representation of the modified machine learning model. For example, the one or more of processors 610*a*-610*n* may generate, for display, a new three-dimensional representation of the modified machine learning model by (1) modifying the values of the virtual object parameters based on the one or more modified components and (2) configuring the values of the virtual object parameters based on the associated weight matrices of the one or more modified components.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for identifying objects based on previous user-object interactions, the method comprising: receiving, from a remote server, configuration data comprising one or more data structures representing a machine learning model, wherein each data structure of the one or more data structures corresponds to a layer of the machine learning model and comprises one or more nodes, edges, and associated weight matrices; generating, using a VR device, a VR representation of the machine learning model by (1) generating virtual objects corresponding to the one or more nodes and edges and (2) configuring values of virtual object parameters for the virtual objects based on the associated weight matrices; rendering, through a virtual display of the VR device, the VR representation of the machine learning model in a spatial domain; identifying, using one or more sensors, a user gesture that indicates a command for a modification of the machine learning model, wherein the modification comprises a change to a weight, a removal of a node, or removal of an edge; responsive to identifying the user gesture, causing execution of a modified machine learning model using input data and obtaining output data for one or more modified data structures associated with the modified machine learning model; and generating, for virtual display, a new VR representation of the modified machine learning model that is being executed by (1) modifying the values of the virtual object parameters based on the one or more modified data structures (2) configuring the values of the virtual object parameters based on the associated weight matrices of the one or more modified data structures, and (3) indicating progress of the input data within the new VR representation using the output data.

2. A method for identifying objects based on previous user-object interactions, the method comprising: receiving a prediction request for a user, wherein the prediction request comprises parameters associated with the user; inputting the parameters associated with the user into a first machine learning model to obtain a first set of object parameters based on a measure of likelihood of interaction by the user with each object corresponding to the first set of object parameters based on dynamic features, wherein the first machine learning model is trained using the dynamic features to identify object parameters associated with the objects that users are likely to interact with based on user-element interactions corresponding to a focus parameter, wherein the focus parameter indicates a portion of a set of features for model concentration; inputting the parameters associated with the user into a second machine learning model to obtain a second set of object parameters based on the measure of the likelihood of interaction by the user with each object corresponding to the second set of object parameters based on stable features, wherein the second machine learning model is trained using the stable features to identify the object parameters associated with the objects that the users are likely to interact with based on stable user-element interactions; identifying, based on the first set of object parameters and the second set of object parameters, one or more objects for the user, wherein the one or more objects are identified using a combined determination based on alignment of object features associated with the one or more objects with predicted features from the first set of object parameters and the second set of object parameters; and providing the one or more objects to the user.

3. A method for identifying objects based on previous user-object interactions, the method comprising: accessing configuration data comprising one or more data structures representing a machine learning model, wherein each data structure of the one or more data structures corresponds to a layer of the machine learning model and comprises one or more nodes, edges, and associated weight matrices; generating a three-dimensional representation of the machine learning model by (1) generating virtual objects corresponding to the one or more nodes and edges and (2) configuring values of virtual object parameters for the virtual objects based on the associated weight matrices; detecting a user gesture that causes a modification of the machine learning model; responsive to detecting the user gesture, causing execution of a modified machine learning model using input data and obtaining data for one or more modified data structures associated with the modified machine learning model; and generating, for display, a new three-dimensional representation of the machine learning model by (1) modifying the values of the virtual object parameters based on the one or more modified data structures and (2) configuring the values of the virtual object parameters based on the associated weight matrices of the one or more modified data structures.

4. The method of the preceding embodiment, further comprising: transmitting a first command for generating and displaying an interactive interface for the one or more objects; and responsive to receiving an indication of a first interaction of the user with an object of the one or more objects, transmitting a second command for modifying a field indicative of an availability of the object.

5. The method of any of the preceding embodiments, wherein the dynamic features and the stable features are obtained through feature extraction comprising: receiving a plurality of records comprising a set of features indicative of (a) user parameters for a plurality of users, (b) corresponding user-element interactions for each user parameter recorded during a period of time, wherein each feature comprises a plurality of values with each value corresponding to a record of the plurality of records, and (c) the focus parameter; generating from the set of features (1) a first subset of the set of features, the first subset comprising concentrated features associated with the focus parameter and generating from the set of features (2) a second subset of the set of features, the second subset comprising foundational features having values recorded over time that provide a baseline for a training dataset; and performing feature extraction using the first subset to obtain dynamic features representative of features that influenced user-element interactions associated with the focus parameter and performing the feature extraction using the second subset to obtain stable features representative of the features that influenced the user-element interactions that are non-specific to any one topic.

6. The method of any of the preceding embodiments, further comprising: training a first machine learning model using the dynamic features of the first subset of the set of features to identify object parameters associated with the objects that users are likely to interact with based on user-element interactions associated with the focus parameter; and training a second machine learning model using the stable features of the second subset of the set of features to identify the object parameters associated with the objects that the users are likely to interact with based on stable user-element interactions.

7. The method of any of the preceding embodiments, wherein identifying the one or more objects for the user comprises inputting the first set of object parameters and the second set of object parameters into a context-specific machine learning model configured to identify the one or more objects ranking highest according to their alignment with the features from both the first set of object parameters and the second set of object parameters.

8. The method of any of the preceding embodiments, wherein identifying the one or more objects comprises: receiving the first set of object parameters and the second set of object parameters; determining a set of objects, wherein each object of the set of objects is characterized by at least one object parameter comprised in both the first set of object parameters and the second set of object parameters; computing, for each object of the set of objects, a score based on a number of object parameters of each object comprised in both the first set of object parameters and the second set of object parameters; and identifying a subset of the set of objects based on the score of each object.

9. The method of any of the preceding embodiments, wherein identifying the one or more objects comprises: determining a first object set based on the objects characterized by at least one object parameter of the first set of object parameters; and determining the one or more objects by filtering the objects of the first object set based on whether or not each object of the first object set is characterized by the at least one object parameter of the second set of object parameters.

10. The method of any of the preceding embodiments, wherein identifying the one or more objects comprises: determining a third set of object parameters based on the object parameters comprised in both the first set of object parameters and the second set of object parameters; and selecting the one or more objects based on each object of the one or more objects being characterized by at least a threshold number of object parameters of the third set of object parameters.

11. The method of any of the preceding embodiments, wherein identifying the one or more objects comprises: determining at least one object parameter of the first set of object parameters is distinct from the object parameters of the second set of object parameters; and selecting the one or more objects based on the objects characterized by a highest number of object parameters of the first set of object parameters and the second set of object parameters.

12. The method of any of the preceding embodiments, wherein the focus parameter relates to a cyclical period of time, and/or is based on categories of inventory available.

13. One or more tangible, non-transitory, computer-readable media storing instructions that, when executed by a data processing apparatus, cause the data processing apparatus to perform operations comprising those of any of embodiments 1-12.

14. A system comprising: one or more processors; and memory storing instructions that, when executed by the one or more processors, cause the processors to effectuate operations comprising those of any of embodiments 1-12.

15. A system comprising means for performing any of embodiments 1-12.

16. A system comprising cloud-based circuitry for performing any of embodiments 1-12.

What is claimed is:

1. A system for visual manipulation and execution of machine learning models rendered using a three-dimensional environment, the system comprising:

one or more processors; and one or more non-transitory, computer-readable media comprising instructions that, when executed by the one or more processors, causes operations comprising:

receiving, from a remote server, configuration data comprising one or more data structures representing a machine learning model, wherein each data structure of the one or more data structures corresponds to a layer of the machine learning model and comprises one or more nodes, edges, and associated weight matrices;

generating, using a virtual reality (VR) device, a VR representation of the machine learning model by (1) generating virtual objects corresponding to the one or more nodes and edges and (2) configuring values of virtual object parameters for the virtual objects based on the associated weight matrices;

rendering, through a virtual display of the VR device, the VR representation of the machine learning model in a spatial domain;

identifying, using one or more sensors, a user gesture that indicates a command for a modification of the machine learning model, wherein the modification comprises a change to a weight, a removal of a node, or removal of an edge;

responsive to identifying the user gesture, causing execution of a modified machine learning model using input data and obtaining output data for one or more modified data structures associated with the modified machine learning model; and generating, for virtual display, a new VR representation of the modified machine learning model that is being executed by (1) modifying the values of the virtual object parameters based on the one or more modified data structures (2) configuring the values of the virtual object parameters based on the associated weight matrices of the one or more modified data structures, and (3) indicating progress of the input data within the new VR representation using the output data.

2. A method for visual manipulation and execution of machine learning models rendered in a three-dimensional space, the method comprising:

receiving configuration data comprising one or more components representing a machine learning model, wherein each component of the one or more components comprises a plurality of nodes, one or more edges, and associated weight matrices of the machine learning model;

generating a three-dimensional representation of the machine learning model by (1) generating virtual objects corresponding to the plurality of nodes and the one or more edges and (2) configuring values of virtual object parameters for the virtual objects based on the associated weight matrices;

detecting a user gesture that indicates a command to perform a modification of the machine learning model;

responsive to detecting the user gesture, causing execution of a modified machine learning model using input data and obtaining output data for one or more modified components associated with the modified machine learning model; and generating, for display, a new three-dimensional representation of the modified machine learning model by (1) modifying the values of the virtual object parameters based on the one or more modified components and (2) configuring the values of the virtual object parameters based on the associated weight matrices of the one or more modified components.

3. The method of claim 2, wherein the modification comprises a change to a weight, a removal of a node, or removal of an edge and wherein causing execution of the modified machine learning model comprises automatically modifying at least one value of one or more nodes, one or more edges, and associated weight matrices to reflect a new configuration for the machine learning model.

4. The method of claim 2, wherein the modification comprises training of the machine learning model and wherein causing execution of the modified machine learning model comprises passing the input data into the machine learning model and updating weights of the associated weight matrices.

5. The method of claim 2, further comprising:

receiving a traversal data structure comprising (1) node identifiers for identifying specific nodes of the modified machine learning model and (2) corresponding output values for each node computed as a result of executing the modified machine learning model on the input data;

identifying one or more virtual objects corresponding to each node of the modified machine learning model based on the node identifiers; and configuring, for each node, the values of the virtual object parameters for a virtual object associated with a node identifier based on a corresponding output value of a node when the machine learning model is executed on the input data to visually emphasize nodes of the modified machine learning model that are activated and/or visually deemphasize the nodes of the machine learning model that are not activated.

6. The method of claim 5, further comprising:

identifying candidate nodes from the nodes for removing from the modified machine learning model based on (1) a number of edges associated with the node, (2) a magnitude of the values of an associated weight matrix of the node, or (3) the corresponding output value of the node when the modified machine learning model is executed on the input data; and generating a three-dimensional visual representation of an interactive element for selection of one or more candidate nodes for removing from the modified machine learning model.

7. The method of claim 6, further comprising:

detecting a second user gesture indicative of a user interaction with the interactive element for the selection of the one or more candidate nodes for removing from the modified machine learning model; and responsive to detecting the second user gesture, transmitting a command for the execution of the modified machine learning model with the one or more candidate nodes removed.

8. The method of claim 2, wherein the virtual object parameters for the virtual objects include opacity of a virtual object, size of the virtual object, border size of the virtual object, color of the virtual object, and/or border color of the virtual object and wherein configuring the values of the virtual object parameters comprises increasing or decreasing the values of the virtual object parameters.

9. The method of claim 2, further comprising:

storing (1) one or more data structures corresponding to the one or more components representing the machine learning model and (2) the three-dimensional representation of the machine learning model as a first version of the machine learning model;

storing (1) the one or more modified components associated with the modified machine learning model, (2) the new three-dimensional representation of the modified machine learning model, and (3) the input data as a second version of the machine learning model; and generating, for display, interactive elements for selection of the first version and the second version of the machine learning model.

10. The method of claim 2, wherein the configuration data further comprises a decision boundary representative of a hypersurface that separates data points in one class from the data points in another class and wherein generating the new three-dimensional representation of the modified machine learning model further comprises generating, for display in a spatial domain, data points of the input data and a surface representing the decision boundary dividing the data points into different classes.

11. The method of claim 2, further comprising:

generating, for display, one or more three-dimensional interactive elements for tuning one or more parameters or selecting or deselecting one or more features in a spatial domain;

detecting a second user gesture indicative of a user interaction with the one or more three-dimensional interactive elements;

responsive to detecting the second user gesture, transmitting data indicative of tuned parameters or selected or deselected one or more features; and updating the one or more three-dimensional interactive elements based on the second user gesture.

12. One or more non-transitory, computer-readable media comprising instructions recorded thereon that, when executed by one or more processors, cause operations for visual manipulation and execution of machine learning models rendered in a three-dimensional space, comprising:

accessing configuration data comprising one or more data structures representing a machine learning model, wherein a data structure of the one or more data structures corresponds to a layer of the machine learning model and comprises one or more nodes, edges, and associated weight matrices;

generating a three-dimensional representation of the machine learning model by (1) generating virtual objects corresponding to the one or more nodes and edges and (2) configuring values of virtual object parameters for the virtual objects based on the associated weight matrices;

detecting a user gesture that causes a modification of the machine learning model;

responsive to detecting the user gesture, causing execution of a modified machine learning model using input data and obtaining data for one or more modified data structures associated with the modified machine learning model; and generating, for display, a new three-dimensional representation of the machine learning model by configuring the values of the virtual object parameters based on the associated weight matrices of the one or more modified data structures.

13. The one or more non-transitory, computer-readable media of claim 12, wherein the modification comprises a change to a weight, a removal of a node, or removal of an edge and wherein causing execution of the modified machine learning model comprises automatically modifying at least one value of the one or more nodes, edges, and associated weight matrices to reflect a new configuration for the machine learning model.

14. The one or more non-transitory, computer-readable media of claim 12, wherein the instructions further cause operations comprising:

receiving a traversal data structure comprising (1) node identifiers for identifying specific nodes of the modified machine learning model and (2) corresponding output values for each node computed as a result of executing the modified machine learning model on the input data;

identifying one or more virtual objects corresponding to each node of the modified machine learning model based on the node identifiers; and configuring, for each node, the values of the virtual object parameters for a virtual object associated with a node identifier based on a corresponding output value of a node when the machine learning model is executed on the input data to visually emphasize nodes of the modified machine learning model that are activated and/or visually deemphasize the nodes of the machine learning model that are not activated.

15. The one or more non-transitory, computer-readable media of claim 14, wherein the instructions further cause operations comprising:

identifying candidate nodes from the nodes for removing from the modified machine learning model based on (1) a number of edges associated with the node, (2) a magnitude of the values of an associated weight matrix of the node, or (3) the corresponding output value of the node when the modified machine learning model is executed on the input data; and generating a three-dimensional visual representation of an interactive element for selection of one or more candidate nodes for removing from the modified machine learning model.

16. The one or more non-transitory, computer-readable media of claim 15, wherein the instructions further cause operations comprising:

detecting a second user gesture indicative of a user interaction with the interactive element for the selection of the one or more candidate nodes for removing from the modified machine learning model; and responsive to detecting the second user gesture, transmitting a command for the execution of the modified machine learning model with the one or more candidate nodes removed.

17. The one or more non-transitory, computer-readable media of claim 12, wherein the virtual object parameters for the virtual objects include opacity of a virtual object, size of the virtual object, border size of the virtual object, color of the virtual object, and/or border color of the virtual object and wherein configuring the values of the virtual object parameters comprises increasing or decreasing the values of the virtual object parameters.

18. The one or more non-transitory, computer-readable media of claim 12, wherein the instructions further cause operations comprising:

storing (1) the one or more data structures representing the machine learning model and (2) the three-dimensional representation of the machine learning model as a first version of the machine learning model;

storing (1) the one or more modified data structures associated with the modified machine learning model, (2) the new three-dimensional representation of the modified machine learning model, and (3) the input data as a second version of the machine learning model; and generating, for display, interactive elements for selection of the first version and the second version of the machine learning model.

19. The one or more non-transitory, computer-readable media of claim 12, wherein the configuration data further comprises a decision boundary representative of a hypersurface that separates data points in one class from the data points in another class and wherein generating the new three-dimensional representation of the modified machine learning model further comprises generating, for display in a spatial domain, data points of the input data and a surface representing the decision boundary dividing the data points into different classes.

20. The one or more non-transitory, computer-readable media of claim 12, wherein the instructions further cause operations comprising:

generating, for display, one or more three-dimensional interactive elements for tuning one or more parameters or selecting or deselecting one or more features in a spatial domain;

detecting a second user gesture indicative of a user interaction with the one or more three-dimensional interactive elements;

responsive to detecting the second user gesture, transmitting data indicative of tuned parameters or selected or deselected one or more features; and updating the one or more three-dimensional interactive elements based on the second user gesture.

* * * * *